United States Patent [19]
Schouten

[11] Patent Number: 5,660,396
[45] Date of Patent: Aug. 26, 1997

[54] WHEY DRAINING APPARATUS HAVING SEALING ELEMENT

[75] Inventor: Frank Schouten, WR Donkerbroek, Netherlands

[73] Assignee: Tebel—MKT B.V., Leeuwarden, Netherlands

[21] Appl. No.: 662,107

[22] Filed: Jun. 14, 1996

Related U.S. Application Data

[63] Continuation of Ser. No. 329,599, Oct. 26, 1994, abandoned.

[51] Int. Cl.$^6$ .............................. F16J 15/00; A01J 11/06
[52] U.S. Cl. ..................... 277/3; 277/34; 277/174; 99/456; 99/458
[58] Field of Search .................. 277/3, 27, 34, 277/34.3, 165, 174; 99/456, 458

[56] References Cited

U.S. PATENT DOCUMENTS

| | | |
|---|---|---|
| 3,982,480 | 9/1976 | Kamphuis .................... 99/456 |
| 4,256,314 | 3/1981 | Berglund et al. ............. 277/27 |
| 4,302,018 | 11/1981 | Harvey et al. ............... 277/34 |
| 4,403,922 | 9/1983 | Roeder ....................... 277/34.3 |
| 4,890,849 | 1/1990 | Eason ........................ 277/174 |
| 5,054,374 | 10/1991 | Scobie et al. ................ 277/174 |
| 5,180,008 | 1/1993 | Aldridge et al. ............. 277/34 |

FOREIGN PATENT DOCUMENTS

| | | | |
|---|---|---|---|
| 0220336 | 6/1987 | European Pat. Off. ....... | F16L 13/02 |
| 0340385 | 11/1989 | European Pat. Off. ....... | F16J 15/46 |
| 0 621 429 | 10/1994 | European Pat. Off. . | |
| 1918804 | 12/1970 | Germany ................... | F16J 15/46 |

Primary Examiner—Daniel G. DePumpo
Attorney, Agent, or Firm—Pennie & Edmonds, LLP

[57] ABSTRACT

The invention relates to a sealing element for forming a liquid-tight seal between two tubular elements running essentially parallel. The sealing element consists of positioning means which are in the form of a flange which is fixed to the inner element of the tubular elements and which is provided on its periphery with a groove which accommodates, in a slightly wedged fit, an endless element of flexible material sealing the groove. On the inside of the groove one or more supply apertures for a compressed medium are present. When the compressed medium is supplied, the endless element of flexible material is moved outwards against the outer element of the tubular elements, in order to form a liquid-tight seal between the two columns. The element can be manufactured simply and cheaply from commercially available materials. The element is also easy to remove from the positioning means and replace. If water is used as the compressed medium, in the event of leakage's, no damage is caused to the products. The sealing element according to the invention can be used in a curd drainage apparatus form removing whey in cheese making. The invention also relates to a device for removing whey from a whey/curd mass, provided with at least one sealing element according to the invention.

12 Claims, 2 Drawing Sheets

WHEY DRAINING APPARATUS HAVING SEALING ELEMENT

This is a continuation of application Ser. No. 08/329,599, filed Oct. 26, 1994, now abandoned.

The invention relates to a sealing element for forming a liquid-tight seal between two tubular elements running essentially parallel, such as an inner and outer column of a curd drainage apparatus, at least comprising an endless element of flexible material which interacts with one of the tubular elements, and of which at least a part of the periphery can be moved in such a way under the influence of a pressure medium that it rests against the other tubular element and provides a seal, while said endless element of flexible material is connected to positioning means fixed to the first-mentioned tubular element. Such a sealing element is generally known.

In the preparation of cheese, a whey/curd mass produced following the addition of enzymes and a starter(bacterial culture of lactic acid) to milk is guided through a drainage apparatus, in order to remove whey from the mass. Such an apparatus comprises one or more moulding pipes which are made up of an inner and an outer column. The space between these columns is divided by partitions into several chambers which are shut off from each other by means of sealing elements. The chambers thus formed, called counterpressure chambers, are connected to riser pipes for removing whey from the whey/curd mass. These counter pressure chambers combined with the riser pipes regulate the removal of whey by building up a counter pressure.

The known sealing element is situated on the inside wall of the outer column. The positioning means comprise a flange which is provided on its inner periphery with a groove. An inflatable rubber band or hose is placed in the groove. The band, which has a special profile and a special shape, is situated in a press fit in the groove of the flange. The flange is provided with a supply pipe for a pressure medium, in particular air. This supply pipe is permanently fixed to the rubber band. The band can be inflated by supplying the medium through this pipe. When the band is inflated, it expands and moves slightly out of the groove, thereby coming into contact with a flange placed on the inner column, in order to form a liquid-tight seal between the two columns.

The band or hose must have a special profile and a special shape, because while it is being inflated only the inner periphery of the band can move. The outer periphery is held in place by the groove of the flange.

The special shape and the special profile of the band make it expensive to manufacture. In addition, this band has the disadvantage that it has to be manufactured specially and very accurately and has a long delivery time. Another disadvantage of this band is that it is not easily replaced. The costs involved in using this known sealing element are therefore high.

Another disadvantage is that air is used as the pressure medium. If there is a leak, this air can come into contact with the whey, which is undesirable from the point of view of hygiene and also in terms of economics, because the whey then turns sour, and the market value of sour whey is low. If there is a leak, air can also reach the curd mass, which is equally undesirable.

The object of the invention is to provide a sealing element which is simple and cheap to manufacture.

Another object of the invention is to provide a sealing element in which no compressed gaseous medium needs to be used.

Yet another object is to provide a sealing element which is easily removed and replaced, without the need for auxiliary tools.

The sealing element according to the invention is characterized in that the positioning means are in the form of a flange which is fixed to the inner element of the tubular elements, and which is provided on its outer periphery with a groove which receives the endless element of flexible material sealing the groove, and in that on the inside of the groove one or more supply apertures for a pressure medium are present.

The sealing element according to the invention is situated on the inner column, which is removable, with the result that an easily accessible construction is obtained. When the pressure medium is supplied, it will fill the space in the groove behind the endless sealing element of flexible material and spread there. Since the element fits exactly into the groove and seals the groove, the medium in the space behind the element will build up a pressure, with the result that the element moves outwards. The element is then pressed against the outer column, in order to form a liquid-tight seal between the inner and the outer column.

The sealing element according to the invention has the advantage that the element can be made of materials which are commercially available. In addition, the endless element is simple to manufacture, for example by cutting it off straight at the desired length and joining the two ends to each other by welding or gluing or in some other suitable way. The manufacturing costs of this element are therefore low compared with those of the known inflatable band.

The removal and replacement of the element are also very simple and can be carried out without auxiliary tools.

If, in the absence of compressed medium, the outside of the groove and of the periphery of the element lie in roughly the same cylindrical plane, the seal can be achieved advantageously through the fact that the movement of the element under the influence of the compressed medium is less than half the width of the element.

In a preferred embodiment of the sealing element, the element is of annular shape, which means that the space filled with pressure medium in the groove behind the element is the same size all over, and uniform pressure can thus be built up by this medium and exerted on the element.

The element is preferably made of rubber or an elastic plastics, material because the endless element can then easily be fixed in a slightly wedged fit sealing the groove; a suitable material is neoprene rubber.

From the point of view of hygiene, the element is preferably of a solid construction.

In another embodiment, the cross-section of the element when not under pressure is preferably round, so that the element seals the groove well. Other shapes such as square or rectangular are equally possible, if the condition that the groove should be well sealed is met.

In another possible embodiment of the sealing element according to the invention, the element is mounted under pretension in the groove, so the element lies fully in the groove when not under the influence of the pressure medium. In this way the inner column is easily removed from the outer column.

With the same object, the sealing element according to the invention can also be designed in such a way that when in the non-sealing position, the element lies fully in the groove, under the influence of the pressure medium having a subatmospheric pressure. In this way the medium exerts a suction force on the element, so the element is sucked into the groove.

In another embodiment, the supply means for the compressed medium are suitable for supplying liquid medium, preferably suitable for supplying water. In the event of leaks, water causes no damage to the products, unlike air which does have a damaging effect on the whey and the curd.

In order to ensure an even better seal, the positioning means preferably do not include a flange on the outer element of the tubular elements. In this case the inside wall of the outer element of the tubular elements is flush. In the sealing position the element will deform slightly through the pressure applied by the compressed medium, with the result that the contact surface of said element with the inside wall of the outer element is increased. If the inside wall of the outer element of the tubular elements is flush, the inner element is easily placed in the outer element, because the sealing element on the inner element does not have to be positioned relative to a flange on the outer element, as is the case with the known sealing element.

The positioning means can also comprise discharge means for the pressure medium. In this way the pressure medium can easily be discharged in the non-activated state of the sealing element. It is also possible in this way to circulate cleaning fluid behind the element, for cleaning the element and the space behind it. The fact that the sealing element is easily removable also makes satisfactory cleaning from the outside possible.

The invention also relates to an apparatus for draining whey from a whey/curd mass, provided with at least one moulding pipe, consisting of an inner column and an outer column and at least one sealing element between the two columns, and is characterized in that the device has at least one sealing element of the type according to the invention described above. The incorporation of sealing elements according to the invention means that the apparatus can be operated with great reliability. The simple design ensures that the seal functions at all times.

Although, in the case of the prior art design, the seal is fitted once on the fixed outer column, and, in the case of the device according to the invention, the seal is fitted the same number of times on an inner column as the number of inner columns to be used with the outer column, the design of the sealing elements is so much simpler and the parts thereof are so much cheaper that with an average number of inner columns per drainage apparatus (two to three) the cost per apparatus is halved. Three to four sealing elements are required per inner column.

The invention is explained in greater detail with reference to the appended drawings, in which.

Figure 1:
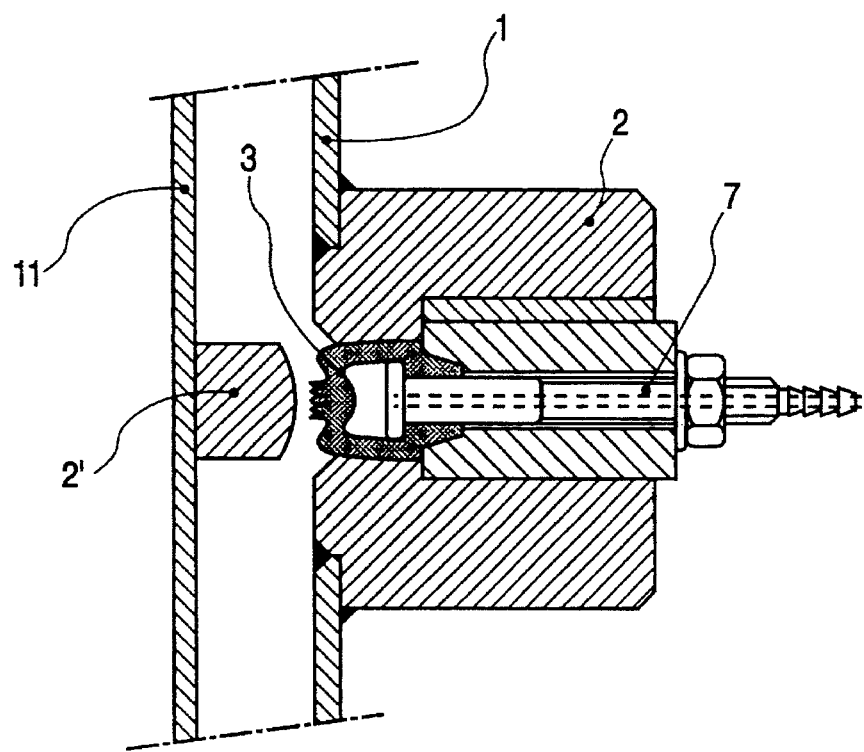
FIG. 1 shows a sealing element according to the prior art.

FIG. 1 shows a diagrammatic representation of a sealing element according to the prior art. This sealing element is fitted on the outer tubular column 1 of which only a part is shown in cross-sectional view and includes a flange 2. In the flange 2 a hollow inflatable band or hose 3 is mounted, which is connected to supply means 7 for the supply of air. When the hollow band 3 is inflated by way of the means 7 for the supply of air, the inner periphery of the band 3 moves outwards, i.e. inwards in the column and comes into contact with a flange 2' on the inner column 11, in order to form a seal between the two columns 1 and 11. This figure shows clearly the special profile and the special shape of the band or hose 3.

Figure 2:
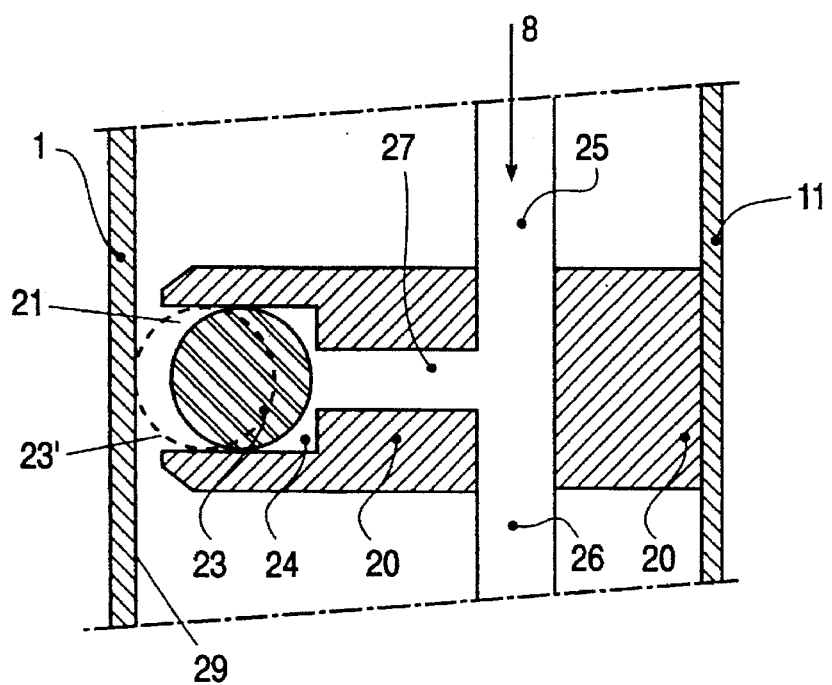
FIG. 2 shows by way of example, an embodiment of a sealing element according to the invention.

FIG. 2 shows a diagrammatic representation of an example of an embodiment of a sealing element according to the present invention, in which parts which are identical to the parts of the device shown in FIG. 1 are indicated by the same reference numbers.

The sealing element includes a flange 20 disposed on the inner column 11 of an apparatus for draining whey from a whey/curd mixture. The flange 20 has a groove 21 at its outer periphery. The groove 21 accommodates an endless element 23, which fits in a sealing manner in the groove 21. The element preferably is slightly compressed when it is situated in the groove so as to ensure an effective seal. The space 24 behind the endless element 23 in the groove 21 is in communication with supply means 25, 26, 27 for supplying a pressure medium 8. Supplying the pressure medium 8 by way of the supply means 25, 26, 27 provided for the purpose causes the space 24 behind the element 23 in the groove 21 to be pressurized. The element 23 stretches and moves outwards under the influence of the pressure medium 8 and comes into contact with the inner wall surface 29 of the outer column 1. The position of the element 23 when it is in the extended position under the influence of the pressure medium 8 is indicated at 23' by a dotted line in FIG. 2. The element 23 is deformed slightly at the place where it comes into contact with the smooth inside wall 29 of the outer column 1, whereby the contact surface and thus the sealing effect is increased.

Figure 3:
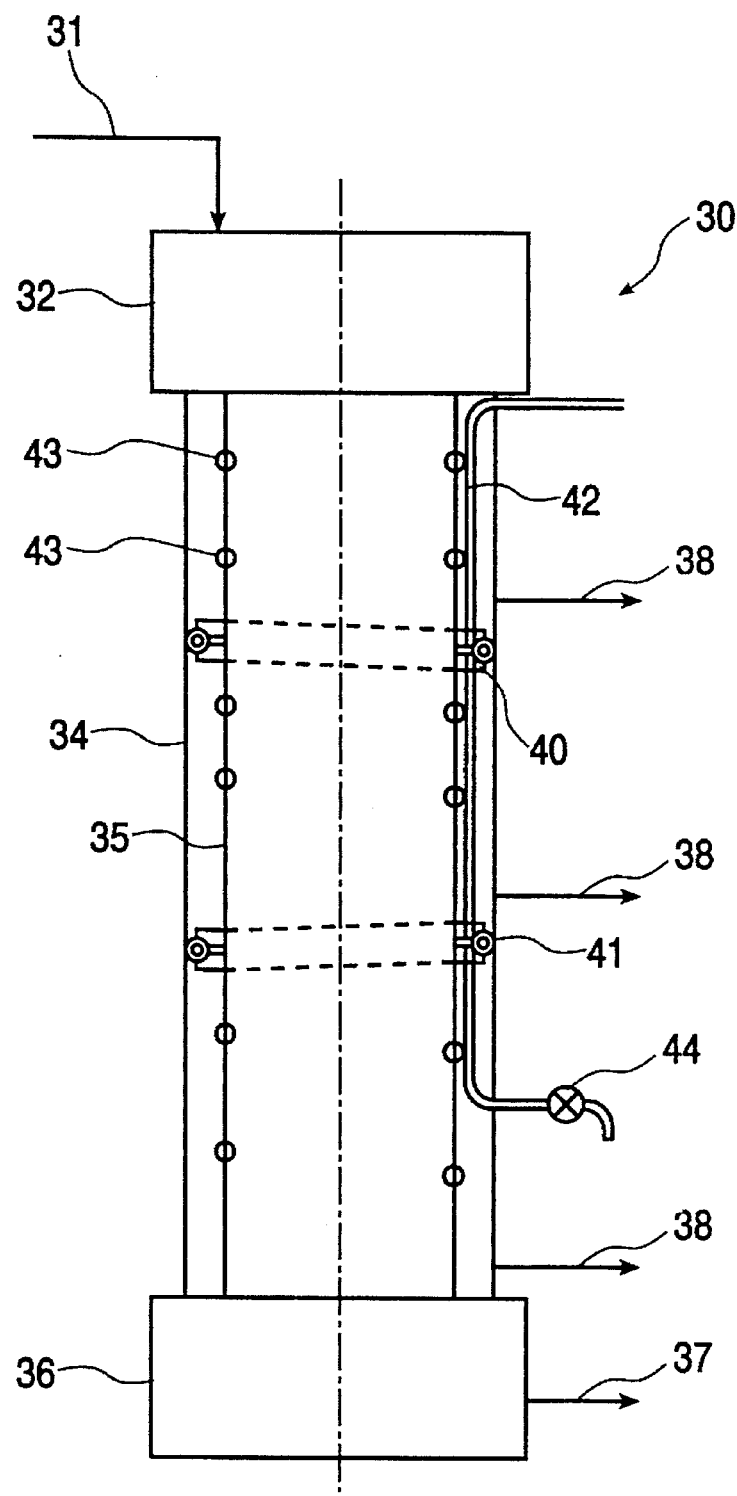
FIG. 3 diagrammatically shows an example of a drainage apparatus including sealing elements according to the present invention.

FIG. 3 schematically shows an example of an apparatus 30 for draining whey from a whey/curd mixture. The whey/curd mixture is supplied by a tube or hose as indicated at 31 to an inlet device 32 on top of a column 33 comprising an outer tube 34 and a concentrically mounted inner perforated tube 35 having perforations 43. At the bottom of the column 33 means 36 are provided for separating and removing blocks of curd from the column. The means 36 has a line 37 for removing whey. In a similar manner the column has a number of lines 38 for removing whey from the space 39 between the outer and inner tubes. This is all known in the art, for example from U.S. Pat. No. 3,982,480.

The space 39 between the inner and outer tubes is subdivided into annular subspaces by means of sealing elements according to the present invention. In the example shown two sealing elements 40, 41 have been used thus providing three separate subspaces. At 42 a supply duct (pipe, hose or line) for pressure medium has been shown. In this example the line 42 serves both sealing elements, but of course it would be possible to provide a separate supply line for each sealing element, thereby facilitating individual control of the sealing force of each element. Pressure discharge means 44 can be used to discharge the pressure medium.

The sealing elements may be used as shown intermediate the top and bottom ends of the column but could also be provided at the top and bottom ends, In that case intermediate sealing elements may or may not be present.

I claim:

1. Apparatus for draining whey from a whey/curd mass, said apparatus comprising:
    at least one column, said column comprising an inner tubular member having a plurality of perforations and an outer tubular member;
    drainage lines connected to said column for removing whey from a space between said inner and outer tubular members;
    at least one sealing element between the two tubular members, said sealing element comprising
        a flange mounted around an outer surface of said inner tubular member;

a groove extending around an outer periphery of said flange;

an endless element at least partly disposed in said groove, said endless element being fitted to said groove in a sealing manner; and a supply aperture disposed on an inside surface of said groove; and a supply duct connected to said supply aperture for supplying a pressure medium into a space behind said endless element;

wherein said endless element moves outward and comes into contact with an inner wall surface of said outer tubular member when said endless element is under pressure from said pressure medium.

2. The apparatus of claim 1, wherein the endless element mover outward less than half its width when under pressure from the pressure medium.

3. The apparatus of claim 1, wherein the endless element has an annular shape.

4. The apparatus of claim 1, wherein the endless element is made of one of the group consisting of rubber and elastic plastic.

5. The apparatus of claim 1, wherein the endless element is made of solid material.

6. The apparatus of claim 1, wherein a cross-section of the endless element is round, when said endless element is not under pressure from the pressure medium.

7. The apparatus of claim 1, wherein the endless element is mounted under pre-tension in the groove (4), such that said endless element lies fully in the groove (4) when not under pressure from the pressure medium (8).

8. The apparatus of claim 1, wherein the endless element (3) lies fully in the groove (4) when under sub-atmospheric pressure from the pressure medium.

9. The apparatus of claim 1, wherein the supply duct is arranged to supply a liquid pressure medium.

10. The apparatus of claim 1, wherein the supply duct is arranged to supply water.

11. The apparatus of claim 1, further comprising means to discharge the pressure medium.

12. The apparatus of claim 1, wherein at least a portion of the supply duct runs in the space between the inner and outer tubular members and connects to at least one sealing element.

* * * * *